May 25, 1937.  E. J. BISEL  2,081,133
MEASURING APPARATUS
Filed June 1, 1934  3 Sheets-Sheet 1

Inventor
E. J. Bisel
By Philip F. Liggers
Attorney

May 25, 1937.  E. J. BISEL  2,081,133
MEASURING APPARATUS
Filed June 1, 1934  3 Sheets-Sheet 2
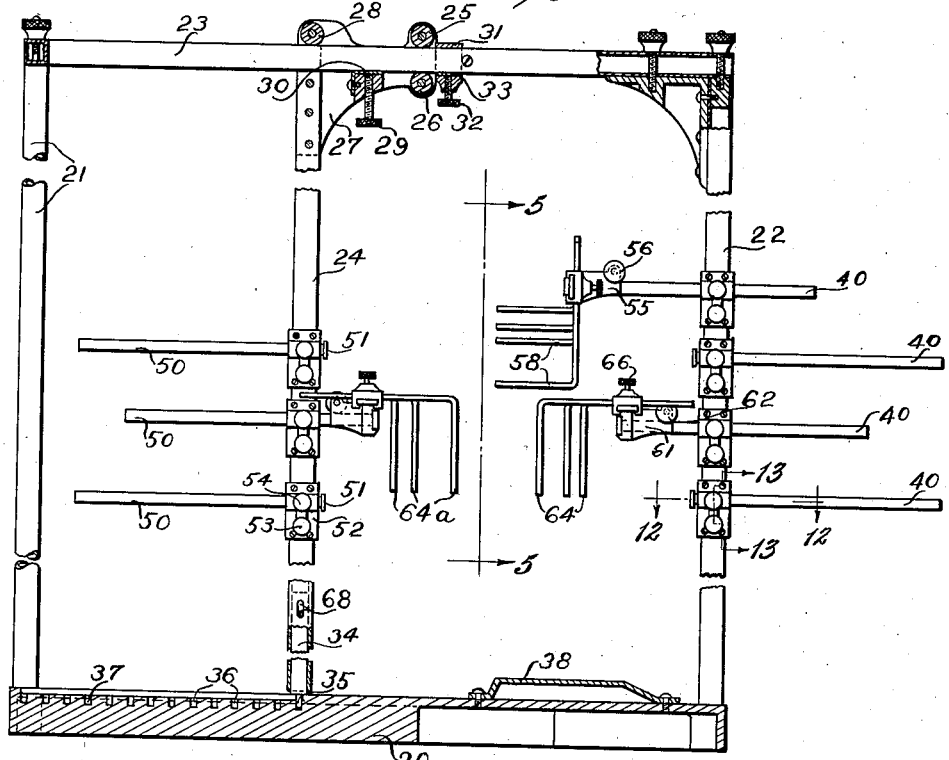
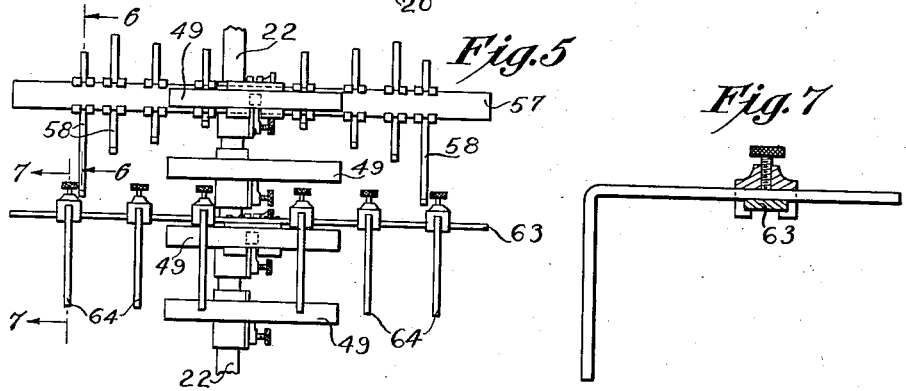
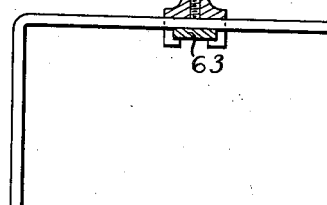
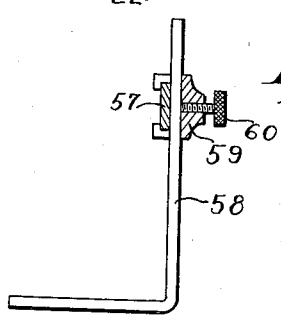
Inventor
E. J. Bisel
By Philip P. Liggers
Attorney May 25, 1937.  E. J. BISEL  2,081,133
MEASURING APPARATUS
Filed June 1, 1934  3 Sheets-Sheet 3

Inventor
E. J. Bisel
By Philip F. Siggers
Attorney

Patented May 25, 1937

2,081,133

UNITED STATES PATENT OFFICE 2,081,133

MEASURING APPARATUS

Edwin J. Bisel, Uniontown, Pa.

Application June 1, 1934, Serial No. 728,577

11 Claims. (Cl. 33—2)

This invention relates to measuring apparatus and among other objects aims to provide an improved device which is particularly useful in measuring a person for clothes but which may also be used by physicians and others.

The present invention is an improvement on the apparatus disclosed in my pending application, Serial No. 598,813, filed March 14, 1932, the most important improvement being the provision of an apparatus whereby accurate measurements may be taken of the contour of the chest, back and shoulders of the person being measured. Other improvements provided by the present apparatus will be disclosed in conjunction with the following description of the preferred embodiment of the invention as shown in the accompanying drawings forming a part of this specification.

In said drawings,—

Fig. 4 is an enlarged sectional elevation, the parts of the standards being broken away so as to conserve space and showing the chest, back and shoulder measuring devices in position;

Fig. 5 is a section on line 5—5 of Fig. 4;

Fig. 6 is a section on line 6—6 of Fig. 5;

Fig. 7 is an enlarged section on line 7—7 of Fig. 5;

Figure 3:
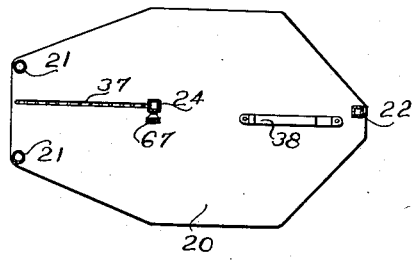
Fig. 3 is a horizontal section on line 3—3 of Fig. 1.
Figure 8:
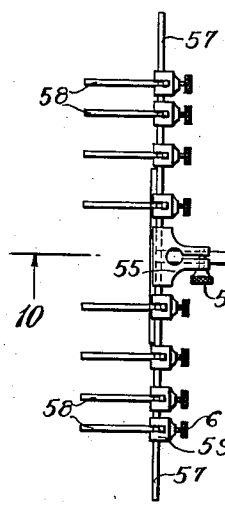
Fig. 8 is a top plan view of the shoulder measuring attachment shown in Fig. 4.
Figure 9:
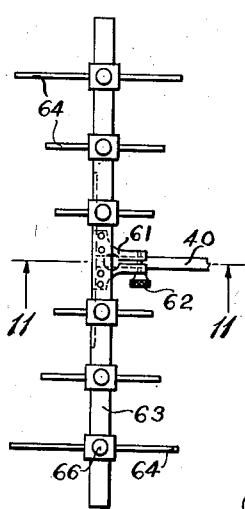
Fig. 9 is a top plan view of the chest or back measuring attachment shown in Fig. 4.

Referring particularly to the drawings, there is shown a base 20, which is preferably flat and of some light weight metal such as aluminum to which a pair of tubular standards 21 are removably fixed. The standards 21 are preferably located at one end of the base 20, as shown in Fig. 3, so that the medial plane or longitudinal axis of the base 20 is mid-way between said standards. Another standard 12, preferably square in cross-section, is removably secured to the opposite end of the base 20 and is secured to the tubular standards 21 by means of a T-shaped brace 23, connecting the upper ends of the three standards. The brace 23 is also preferably square in cross section as indicated in Fig. 4. The base 20, standards 21 and 22 and the brace 23 together provide a frame for supporting the adjustable members which are brought into contact with various parts of the body being measured so as to determine accurately the contour of said body.

All the measuring members are carried upon the standard 22, which is fixed, and upon a movable standard 24, which is adjustable in a vertical plane toward and from said fixed standard. As shown in Fig. 4, the upper end of the adjustable standard 24 is so formed as to embrace the main arm of the T-shaped brace 23 and carries a pair of rollers 25 and 26 on a bracket arm 27, roller 25 being adapted to roll along the top surface of the main arm of brace 23, while roller 26 is adapted simultaneously to contact with the under surface of the same. A third roller 28 is carried by the upper end of standard 24 and is adapted to roll along the top of brace 23. A set screw 29 passing through the bracket 27 bears against a shim 30, which is adapted to be pressed against the under side of brace 23 by means of the end of the set screw 29, thus securing the bracket 27 and hence the upper end of standard 24 to the brace 23. A stop piece 31 which embraces the main arm of brace 23 has a set screw 32 passing therethrough from underneath and adapted to bear against a shim 33, which contacts with the under side of brace 23. The stop piece 31, when fixed to the brace 23 after being abutted against the outer end of bracket 27, as shown in Fig. 4, makes it possible for the operator to remove the standard 24, make alterations in the measuring members or carry on other operations as will be described, and return the standard to the same position. The lower end of the adjustable standard 24 carries a movable bolt 34 having a reduced end 35 adapted to engage in one of a series of recesses 36 in the base 20. The recesses 36 are provided at regular intervals in the bottom of a straight groove 37, which, as shown in Fig. 3, extends from one end of the base 20 toward the fixed standard 22 and substantially in the same vertical plane as said standard. The slot 37 is parallel to and slightly spaced from the medial plane on a longitudinal axis of the base 20, as shown in Fig. 3, and as there shown, the fixed standard 22 is also slightly spaced from said axis. The reason is that the measuring devices are all carried on the same side of the standards 22 and 24 and said measuring devices are all substantially in the medial plane of the apparatus. Lying in the same plane is a body positioning member 38 which is attached to the base 20 and extends slightly above the same, being adapted to properly position the body of the person whose measurements are being taken, such person standing on the base with his heels in contact with and on opposite sides of the positioning member 38.

Figure 1:
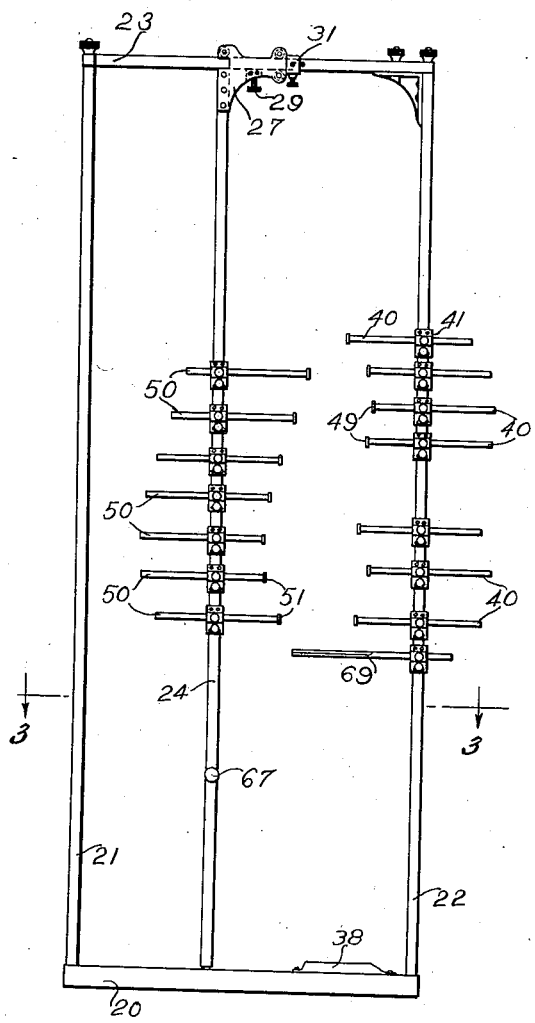
Fig. 1 is an elevation of the apparatus, the parts being shown in the positions they may have after one set of measurements has been made.
Figure 12:
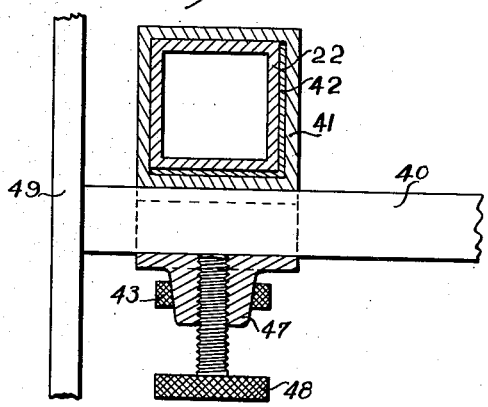
Fig. 12 is an enlarged section on line 12—12 of Fig. 4.
Figure 13:
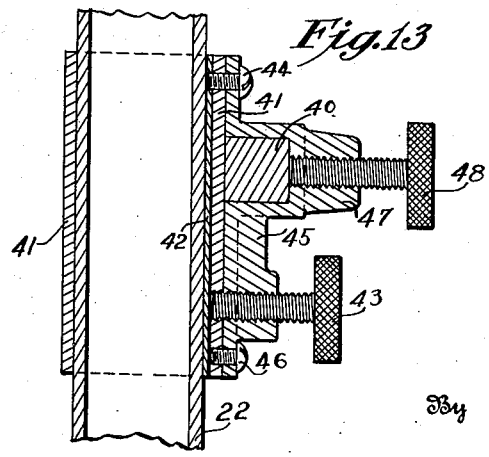
Fig. 13 is an enlarged section on line 13—13 of Fig. 4.

Adjustably secured to the non-circular standard 22 are a plurality of measuring arms 40, each of which is vertically and horizontally adjustable by means of the construction shown in Figs. 12 and 13. Each measuring arm 40 is slidably received within a sleeve 41 which is slidable vertically on the standard 22 and which embraces said standard as shown in Fig. 12. Preferably the opening provided for the standard 22 is somewhat larger than the outside dimensions of said standard so that a shim 42 may be introduced between the sleeve and the standard, said shim preferably being L-shaped and being tightened against the outer wall of the standard by means of a thumb screw 43. The shim 42 is secured to the inside of the sleeve by means of a screw 44. A sleeve extension 45 is secured to the sleeve by means of screw 44 and a second screw 46, and said sleeve extension has a boss 47 through which a thumbscrew 48 is threaded, the inner end of the thumbscrew bearing against the measuring arm 40. When the thumbscrew 43 is tightened, the sleeve will be prevented from sliding vertically and when the thumbscrew 48 is tightened, the measuring arm will be held against horizontal sliding. Each of the measuring arms is T-shaped, having a bar 49 at the inner end where the measurements are taken, said bar being at right angles to the measuring arm. These bars are best shown in Figs. 5 and 12. As shown in Fig. 1, there are seven of the measuring arms 40, but a larger or smaller number may be employed.

The adjustable standard 24 also carries a plurality of measuring arms 50, as best shown in Figs. 1 and 4, each of the measuring arms being T-shaped and having bars 51 at their inner ends adapted to contact the body of the person being measured. The measuring arms 50 are slidable through sleeves 52 which are exactly like the sleeves 41 and which are secured to the standard 24 in the same manner that the sleeves 41 are secured to the fixed standard 22. Set screws 53 and 54 respectively secure each sleeve 52 to the standard and each measuring arm to the sleeve. As shown in Fig. 1, there are seven measuring arms on the adjustable standard 24, but a larger or smaller number may be employed if desired.

The described measuring appliances make possible an accurate determination of the front and rear and side contours of a human body but the most difficult parts of such a body to fit are the shoulders, the back, especially below the neck, and the chest. The present invention provides means for measuring or rather determining accurately the contours of all these parts.

Figure 10:
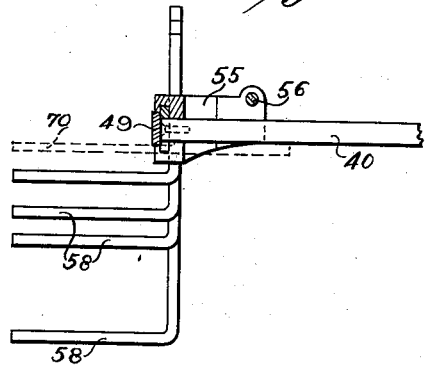
Fig. 10 is an enlarged section on line 10—10 of Fig. 8, showing in dotted lines the manner in which a measuring bar is used.
Figure 11:
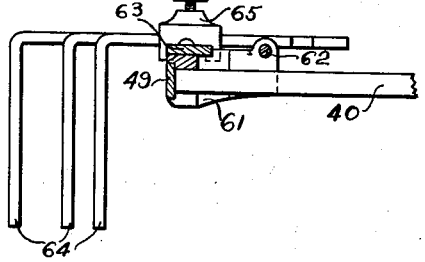
Fig. 11 is an enlarged section on line 11—11 of Fig. 9.

Referring to Figs. 4, 5, 6, 8, and 10, the uppermost measuring arm 40 carries a bracket 55, which is secured to said arm by means of the clamping screw 56. The bracket 55 rigidly holds a rod 57 which is preferably horizontal and straight and which carries a plurality of L-shaped measuring fingers 58, each of which is individually clamped to the rod 57 by means of a clamp 59 (see Fig. 6) provided with a screw 60. The measuring fingers 58 may be set in various positions along the rod 57, that is, their spacing may be varied at will, and their height or horizontal adjustment relative to the rod 57 may also be adjusted as will be clear from Figs. 8 and 10. Ordinarily, as shown in Figs. 4 and 10, the measuring fingers 58 extend in a horizontal position although at varying elevations. If a person stands on the platform or base 20 and the uppermost rod 40 bearing the shoulder measuring attachment is moved downwardly until said attachment is spaced slightly above his shoulders, the several measuring fingers 58 may be properly spaced in a horizontal direction along rod 57 and may be properly adjusted vertically, as will be understood from Fig. 5, to determine as accurately as is desired the exact contour or slope of both of the shoulders. While eight of the measuring fingers are shown, four for each shoulder, obviously, as many more may be employed as will be deemed necessary by the person making the measurements.

To determine the contour of the chest and back of the person being measured, two similar measuring appliances are employed on the opposed standards 22 and 24. Referring to Figs. 4, 5, 9, and 11, it is clear that one of the arms 40 carries a bracket 61 at one end, said bracket being made fast by means of the clamping screw 62. The bracket 61 carries a flat bar 63 along which a plurality of L-shaped measuring fingers 64 are adjustably secured by means of individual clamps 65 and screws 66. The measuring fingers 64 extend vertically but are horizontally adjustable along the bar 63 and are also horizontally adjustable inwardly and outwardly relative to said bar, as will be understood from Figs. 9 and 11. While only six of the measuring fingers 64 are shown, the number may be increased or decreased at will. Obviously, when the fingers 64 are adjusted so as to touch the back of the person being measured, the contour of said back at that particular elevation will be determined with a considerable degree of accuracy. By adjusting the carrying bar vertically along the standard 22, the contour of the back at other elevations will be readily determined. Carried upon one of the measuring arms 50, which is vertically adjustable on the adjustable standard 24, is a chest measuring appliance which is exactly like the appliance previously described for determining the contour of the back. The chest measuring appliance employs a plurality of fingers 64a and is otherwise similar in every respect to the described appliance. By employing two measuring appliances on opposite sides of the person's body, such person need not turn around in order to have all necessary measurements taken.

Figure 2:
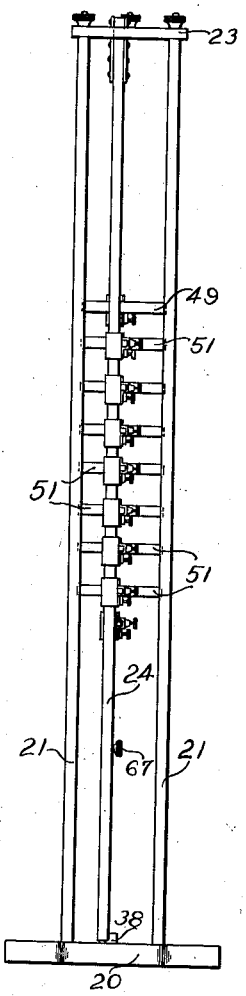
Fig. 2 is a side elevation of the same, but the view being from the left side of Fig. 1.

When the described apparatus is used, the adjustable standard 24 is moved out of the way, and the person whose measurements are to be taken stands on the platform 20 with his heels against the positioning member 38. The adjustable standard is then moved toward him so that the measuring devices may be easily extended to make contact with various parts of his body. The stop member 31 has of course been loosened so that movement of the adjustable standard toward the fixed standard is not impeded. When the adjustable standard is in the proper position relative to the body, the screw 29 is tightened and the stop member 31 is brought into contact with the end of bracket 27 and is secured to the brace 23 by its screw 32. When adjusting the standard 24, the bolt 34 (which may be spring projected as will be understood without illustration) is lifted by means of a knob 67 (Figs. 1 and 3) whose inner end forms a pin and slot connection with the standard 24, the slot being indicated at 68 in Fig. 4. A crotch-engaging arm 69, which is clamped to the standard 22 by means of a sleeve similar to the sleeves 41, is engaged with the crotch and the uppermost arm 40 is engaged with the back of the neck at a point where the rear collar button is located. The measuring arms 40 and 50 are then moved forwardly toward each other until each one engages the body, the front and rear profiles of said body being thus determined. The arms 40 and 50 are then clamped to the standards and the bar 69 is retracted and the adjustable standard 24 is moved to the left so that the person can step out of the apparatus. The adjustable standard is then returned to its former position, this being easily done because of the stop 31 which has not been moved. A plotting board with a sheet of paper and a tailor's square and measuring stick are then placed upright on the base so that the paper contacts with the left-hand ends of the bars 49, 51, as viewed in Fig. 2. The positions of the bars 49, 51 determine the markings to be made on the paper, a pencil mark being made at the end of each of said bars. Thus, the front and rear contours of the body are transferred directly to the sheet of paper, which permits the person taking the measurements to withdraw all but three of the measuring arms 40 and 50 and to concentrate upon determining the contours of the shoulders, the back and the chest.

Figure 14:
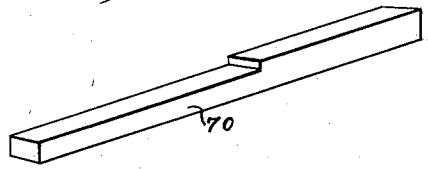
Fig. 14 is a detailed perspective view showing one of the measuring bars employed with the shoulder measuring attachment of Figs. 8 and 10.

The shoulder, back and chest measuring appliances previously described are then mounted on the measuring arms 40 and 50 and with the adjustable standard moved out of the way, the person being measured again takes his position on the platform. The adjustable standard is again brought forward and the several measuring fingers 58, 64, 64a are adjusted to bear at the proper points against the shoulders, back and chest. When the necessary contours have been determined, the person being measured steps out of the apparatus and the adjustable standard is returned to the position which it occupies when he was being measured. The paper on the plotting board is then reversed or else a new sheet of paper is placed on said board and said board is placed in position in front of the shoulder attachment and the various points are marked on the paper from the extremities of the fingers 58. At this time, a bar 70, shown separately in Fig. 14, is placed in a slot in the bracket 55, as shown in dotted lines in Fig. 10, and is moved until its extremity engages the paper on the plotting board. A mark is then made from the extremity of bar 70 to indicate the position of the rear collar button. Thus, the bar 70, in effect, projects the end of the arm 40 forwardly into contact with the paper on the plotting board. Another sheet of paper is then secured on the plotting board which is placed horizontally beneath the lower ends of the fingers 64, 64a and the positions of said fingers are thus transferred to the paper. The various marks are then connected by pencil lines on the several sheets of paper, which will thus indicate as accurately as may be desired the slope of each shoulder, the back contour (at several different heights, if desired) and the chest contour of the person being measured.

At the present time when a suit is ordered, the tailor uses forms which contain charts of various postures, different shoulder slopes etc. and the tailor selects those which resemble the person being measured and supplements them with such measurements as can be taken with a measuring stick or tape measure. With the present apparatus, the same charts may be used by the tailor but he supplements them with the paper charts made as described, which will obviously be quite accurate, indeed, far more accurate than any measurements made from tape measures or by means of apparatus measuring in inches and fractions thereof.

The described apparatus results in more accurate measurements than any heretofore possible by known devices. It makes accurate determinations of the shape or contour of the shoulders, neck, back and chest, as well as the stomach. The measurements are not recorded in inches or other units, with attendant possibility of error, but are marked immediately on paper charts, and as many marks are made as are necessary to attain the desired degree of accuracy. Thus the apparatus may be used by surgeons, by military and naval organizations and by scientific bodies interested in determining physical data of individuals, groups, tribes and races.

Obviously, the present invention is not restricted to the particular embodiment thereof herein shown and described. Moreover, it is not indispensable that all the features of the invention be used conjointly, since they may be employed advantageously in various combinations and sub-combinations.

Having described an embodiment of the invention, what I claim as new and desire to secure by Letters Patent is:—

1. Measuring apparatus comprising, in combination, a base; an upright frame secured upon the base; said frame having a fixed standard; another standard adjustably connected to the base and frame so as to be movable toward and from the fixed standard; and a plurality of horizontally and vertically adjustable measuring arms carried on both said standards.

2. Measuring apparatus comprising, in combination, a base; an upright frame secured upon the base; said frame having a fixed standard; another standard adjustably connected to the base and frame so as to be movable toward and from the fixed standard; a plurality of horizontally and vertically adjustable measuring arms carried on both said standards; and individually, vertically adjustable members carried on one of said measuring arms and adapted collectively to outline the contour of one of the shoulders of the person being measured.

3. Measuring apparatus comprising, in combination, a base; an upright frame secured upon the base; said frame having a fixed standard; another standard adjustably connected to the base and frame so as to be movable toward and from the fixed standard; a plurality of horizontally and vertically adjustable measuring arms carried on both said standards; and individually horizontally adjustable members carried on two measuring arms on opposed standards and adapted to outline the contour of the chest and back of the person being measured.

4. Measuring apparatus comprising, in combination, a base; an upright frame secured upon the base; said frame having a fixed standard; another standard adjustably connected to the base and frame so as to be movable toward and from the fixed standard; a plurality of horizontally and vertically adjustable measuring arms carried on both said standards; individually, vertically adjustable members carried on one of said measuring arms and adapted collectively to outline the contour of one of the shoulders of the person being measured; and individually, horizontally adjustable members carried on said standards and adapted to outline the contour of both the chest and the back of the person being measured.

5. Measuring apparatus comprising, in combination, two relatively adjustable vertical standards; measuring devices vertically and horizontally adjustable on said standards; and measuring fingers horizontally adjustable independently of the measuring devices in two directions at right angles to each other and carried on the ends of certain of said measuring devices.

6. Measuring apparatus comprising, in combination, two relatively adjustable vertical standards; measuring devices which are both horizontally and vertically adjustable and which are carried by said standards; and measuring fingers which are horizontally and vertically adjustable independently of the measuring devices and being carried on the end of one of said measuring devices.

7. Measuring apparatus comprising, in combination, a pair of relatively adjustable vertical standards; a measuring arm which is vertically and horizontally adjustable on one of said standards; a plurality of other measuring arms each of which is individually and horizontally adjustable on one of the said standards; a bracket removably secured to an extremity of the measuring arm first mentioned; a bar which is held by said bracket at right angles to said measuring arm and in a horizontal plane; a plurality of measuring fingers adjustable horizontally along said bar; and means to effect adjustment of said measuring fingers vertically independently of the vertical adjustment of said measuring arm.

8. Measuring apparatus comprising, in combination, a pair of relatively adjustable vertical standards; a measuring arm which is vertically and horizontally adjustable on one of said standards; a plurality of other measuring arms each of which is individually and horizontally adjustable on one of the said standards; a bracket removably secured to an extremity of the measuring arm first mentioned; a bar which is held by said bracket at right angles to said measuring arm and in a horizontal plane; a plurality of measuring fingers adjustable horizontally along said bar; means to effect adjustment of said measuring fingers vertically independently of the vertical adjustment of said measuring arm; a horizontal bar insertable in said bracket and adapted to be held thereby temporarily and forming an extension of the measuring arm to which the bracket is connected.

9. Measuring apparatus comprising, in combination, vertical standards between which a person may stand to have measurements taken; a plurality of individually vertically and horizontally adjustable measuring devices carried by said standards and adapted to determine the front, rear and side profiles of the body; and other measuring devices adjustable on the ends of the measuring device first mentioned to determine the slopes of both shoulders and the contours of the back and chest at various levels.

10. Measuring apparatus comprising, in combination, a pair of relatively movable vertical supports between which a person may stand to have measurements taken; and fingers carried by said supports and adjustable both vertically and horizontally relative to the supports, said horizontal adjustment being effected in two directions at right angles to each other; said fingers being angular, and some having horizontal extremities, while others have vertical extremities.

11. Measuring apparatus comprising, in combination, a support; a pair of relatively movable vertical standards on the support; operator-released means for temporarily holding one of the standards in adjusted position; and opposed measuring devices carried by said standards and independently adjustable vertically and horizontally thereon and adapted simultaneously to contact with both the back and chest or stomach of the person being measured at a plurality of points in the same horizontal plane, to determine accurately the contour of said back and chest or stomach at various heights.

EDWIN J. BISEL.